Sept. 27, 1938.  A. H. NELLEN  2,131,636
TIRE CONSTRUCTION
Filed Feb. 25, 1938
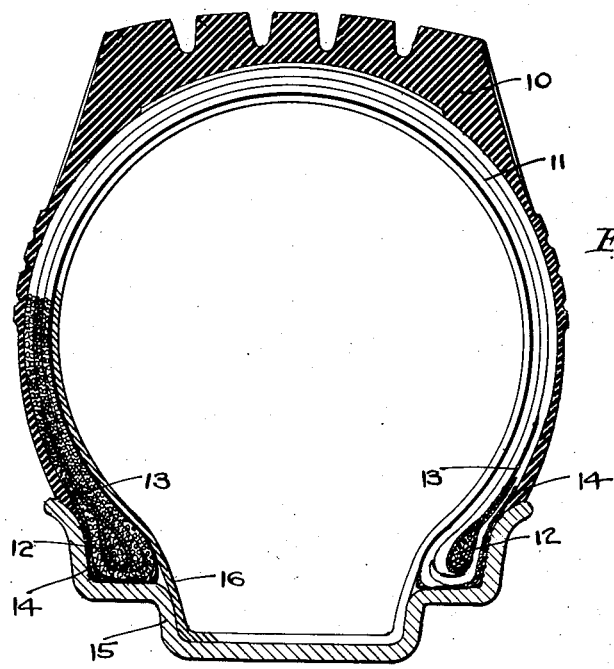
Fig. 1.
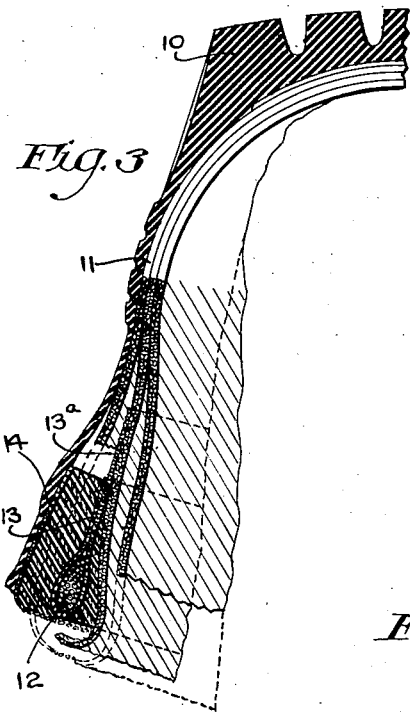
Fig. 3.
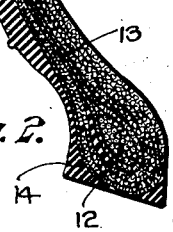
Fig. 2.
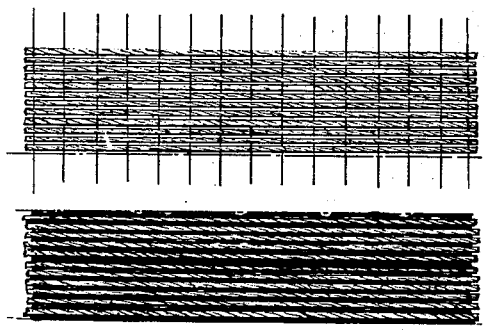
Fig. 4.
Fig. 5.
Inventor
ARTHUR H. NELLEN
By Leo Edelen
Attorney.

UNITED STATES PATENT OFFICE 2,131,636

TIRE CONSTRUCTION

Arthur H. Nellen, Merion, Pa., assignor to Lee Rubber & Tire Corporation, Conshohocken, Pa., a corporation of New York Application February 25, 1938, Serial No. 192,453

7 Claims. (Cl. 152—362)

This invention relates to vehicle tire constructions and more particularly to an improved construction of flipper and chafing strips especially suitable for use as reinforcements in the regions of the tire immediately adjacent the bead thereof.

As is pointed out in my prior patent granted March 30, 1937, Reissue No. 20,316, the desiderata of a properly designed tire carcass are:—(1) flexibility sufficient to resist breakage of the fabric cords due to fatigue induced by repeated flexing thereof caused by the rolling action of the tire; (2) rigidity sufficient to withstand without undue expansion or distortion the internal air pressure to which the tire is subjected while in service; (3) strength sufficient to resist without rupture the severe shocks and blows to which the tire is constantly subjected while in use; and (4) a laminated carcass construction in which internal friction between the cords, as well as between the several cord fabric plies, is reduced to an irreducible minimum.

The foregoing requirements are particularly essential in the side wall portion of the tire extending between the tread and the bead because it is in this portion that the greatest degree of flexing takes place during normal use of the tire. The flexing in this region is essential if any material degree of riding comfort is to be had because in pneumatic tire casings as now constructed the tread thereof, due largely to the mass of rubber of which it is formed, is quite stiff and inflexible, particularly when the tire is inflated. However, it has been found that simply to provide increased flexibility in the side wall of the tire casing is not sufficient to insure maximum life and operating efficiency for the tire casing because the constant flexing of tire side wall during use of the tire, such as is induced by side roll and by acceleration and braking forces particularly in the presence of the circumferential torque stresses and internal air pressure to which all tires are subjected during normal use thereof, eventually causes breaks to occur prematurely in the side wall portions weakened by such flexing.

In an effort to reduce this cause of premature break-down in the side wall of the tire, particularly in the region immediately adjacent the tire bead, resort has been had to the use in the bead portion of the tire of flipper and chafing strips as reinforcing elements. As is well understood in the art, the flipper strip is formed of fabric and is looped or folded directly about the wire core of the tire bead to provide a double thickness flap which extends outwardly of the bead core and into the side wall of the tire, adjoining portions of the flipper strip which form said flap being vulcanized to each other and to the cord fabric plies of the carcass. The chafing strip, which is also formed of fabric, is a protective ply overlying the outermost carcass ply and extending from the toe of the tire bead to and about the heel thereof and thence upwardly to a point in the side wall beyond the edge of the wheel rim flange. While the incorporation of one or more of these various reinforcing elements has had the effect of strengthening and stiffening the bead zone of the tire, it has only been at the expense of reduced flexibility in this zone, and more importantly, it has resulted in the construction of a bead zone so stiff and inflexible that as the tire rolls along the ground the bead toes at the bottom of the tire tend to swing away from the tire supporting wheel rim into chafing contact with the innertube of the tire, eventually resulting, of course, in damage to and failure of the tube.

This failure of innertubes due to chafing thereof by the bead toe of the tire casing is particularly pronounced where the tires are mounted upon the now more or less universally used drop center wheel rims, because the rim flange thereof acts as a fulcrum about which the bead portion of the tire bodily tilts as a unit with the result that the bead toe lifts away from its supporting wheel surface and digs into and chafes through the wall of the innertube. Obviously, objectionable fulcrum action is only aggravated by stiffening the portion of the tire extending from the bead thereof to the point where it emerges from contact with the wheel rim flange, by increasing the internal air pressure of the mounted tire, and by increasing the number of plies of which the tire carcass is formed.

That the various expedients which have been resorted to so far in the art to reduce chafing of the inner tubes, such as the use of specially constructed bead toes designed to minimize the objectionable chafing action as well as the use of heavier and most costly innertubes designed to resist such chafing action, have not proved especially effective is well evidenced by the fact that many leading manufacturers of tires still provide auxiliary rubber flaps which are adapted to be inserted within the well of the present drop center type rim and which extend laterally about the inner tube to a degree sufficient to cover and protect the innertube against chafing by the bead toe, even though such drop center rims are neither designed nor intended for the use of auxiliary protecting flaps.

The reinforcing elements ordinarily employed to stiffen and strengthen the tire casing in the bead zone of the tire are of the so-called square woven fabric composed of interwoven warp and weft cords of approximately equal strength. Such reinforcing elements not only give rise to the objectionable fulcrum action above mentioned which results in innertube chafing, but they also constitute a definite cause of failure in the bead zone of the tire. As will be readily appreciated, constant flexing of the tire side wall about the flange of its supporting wheel rim as a fulcrum often results, particularly under conditions of severe overload, in the intersecting cords of the square-woven reinforcing fabric sawing through one another with consequent failure of the tire at such weakened points. Moreover, such square-woven fabrics are necessarily of such thickness that gum stripping about the edges of such fabric when employed as flipper and chafing strips is practically essential in order to smoothly fit such strips within the tire carcass and avoid sharp edges such as might cut into and through the overlying carcass plies.

Having in mind the foregoing considerations, it is among the objects of the present invention to provide an improved cord fabric which is adapted generally for use in the construction of vehicle tire carcasses and particularly for use as flipper and chafing strips such as are incorporated in the bead zone of the tire casing.

More specifically, it is an object of the present invention to provide cord fabric of such physical characteristics that when employed for reinforcing the bead portion of the tire the objectionable fulcrum action above mentioned is entirely eliminated. The elimination of this objectionable fulcrum is accomplished by the use of the present fabric which is composed wholly or principally of warp cords of such low gauge, low stretch and high twist characteristics that when such fabric is incorporated in the tire, either as a flipper strip or as a chafing strip or both, the flexing of the tire is localized within the side wall portion thereof extending between the tread and a point somewhat above the bead core and is not transmitted to the bead portion per se of the tire, in consequence of which rocking of the bead about the edge of the wheel rim flange as a fulcrum is avoided, thereby eliminating a principal cause of innertube chafing by the bead toe. While of increased flexibility for the purpose just indicated, the improved cord fabric is nevertheless of such limited extensibility and sufficient strength as to resist all of the strains and stresses set up in the bead portion of the tire.

A further object of the invention is to provide a cord fabric wherein the cords composing the same are laid in a single common plane and in parallel relation, the said cords being maintained in such relation by a layer or deposit of rubber composition with or without the intervention of single yarn picks which are interwoven with the cords in the nature of wefts, the cords being of such construction per se and of such number per inch measured linearly across the cords at right angles thereto as to provide a fabric which not only has a high degree of flexibility and a high degree of strength, but which also is of such reduced gauge or thickness that the edges thereof do not require gum-stripping when incorporated within the bead portion of the tire.

Moreover, due to the fact that in the fabric of the present invention the cords composing the same all run in the same direction, when such fabric is incorporated in the tire and is subjected to pressure and heat during the vulcanizing process, the rubber composition with which it has been treated in the calendering process is forced along the spaces between the cords and exudes from between the ends thereof whereby to self-gum-strip the cord extremities which terminate in the cut edges of the fabric.

Finally, and more generally, it is an object of this invention to provide a cord fabric construction composed primarily of warp cords and in which the elongation, gauge, twist and tensile strength characteristics of these warp cords are such as to provide increased flexibility and strength in the bead portion of the tire at the same time that the stretch capacity of the fabric in a direction lengthwise of the warp cords composing the same is materially reduced, whereby the use of such cord fabric in lieu of the usual cross-woven fabric for flipper and chafing strips eliminates one of the principal causes of inner tube chafing at the same time that it eliminates a frequent cause of failure of the tire in the bead zone thereof.

Other objects and advantages of the present invention will appear more fully hereinafter.

In the accompanying drawing:

Figure 1 is a cross-sectional view of a tire constructed in accordance with and embodying the principles of the present invention;

Figure 2 is an enlarged sectional view of a portion of the tire;

Figure 3 is an enlarged view showing the several elements of the bead portion of the tire in more or less separated relation;

Figure 4 is a view showing a portion of the cord fabric constructed in accordance with the present invention and in which single yarn picks are employed to hold the warp cords together; and Figure 5 is a view showing a portion of a cord fabric as constructed without any of said picks.

Referring now more particularly to Figure 1, it will be observed that the tire as constructed in accordance with the present invention resembles in outward appearance the conventionally constructed tire in that it comprises the tread body 10, the inner carcass body 11, the bead members 12, the flipper strip 13 and the chafing strip 14. The tire so constructed is shown mounted upon a wheel rim 15 of the drop center type, the inflated inner tube being designated by the reference numeral 16. As is well understood in the art, the carcass body is composed of a plurality of rubber impregnated cord fabric plies superimposed one upon the other, each ply being so disposed that the cords composing the same extend at a bias or angularly across the carcass body. Also, in accordance with conventional practice, the several cord fabric plies of the carcass are relatively so arranged that the cords of one ply extend in a direction oppositely to the cords of the next adjacent ply, each of the several plies being impregnated and coated with rubber in such manner and to such degree that each individual cord of each ply is embedded in rubber to prevent contact between the adjoining cords in a given ply or between adjoining cords in the superposed plies.

In accordance with the present invention, the cord fabric comprising each of the plies of the laminated carcass body is characterized in that it is composed principally of plied and cabled cords to provide a substantially weftless fabric. In certain instances, these warp cords may be held together by single yarn fillings or picks laid across the warp cords at intervals, while in other instances the filler threads or picks may be entirely eliminated, the warp cords being held together during processing by a layer or deposit of a suitable rubber composition. In either case, the cord fabric is to be considered weftless because even when the single yarn fillings or picks are employed they are of such fine gauge and of such little strength as compared to the gauge and strength of the warp cords that they impart no particular strength to the cord fabric. The cord fabric of which the flipper strip and chafing strip is formed is similarly made of warp cords disposed in a single common plane and held together in parallel relation by suitably spaced picks or by a layer or deposit of rubber.

As has been indicated hereinbefore, the warp cords of the cord fabric of the present invention are of low stretch, low gauge and high twist characteristics, such cord being produced by twisting the yarn of which it is composed into the desired cord structure by any suitable process, such as that known as "wet twisting" or that disclosed in the Brownell Patent No. 2,075,777, granted March 30, 1937. The cords generally used in tire construction are of the 2—2, 2—3, 3—2, 3—3, 4—3, 4—3 and 5—3 constructions and I have found that when cords of these constructions are twisted with a ply twist of not less than nineteen turns per inch and a cable or cord twist of not less than nine turns per inch, there is imparted to the resultant cord an exceedingly low stretch characteristic, at the same time that the gauge thereof is very materially reduced. In the above listed types of cord constructions, the first numeral represents, of course, the number of yarns which are twisted together to form a ply or strand, while the second numeral represents the number of such strands which are twisted together to form the finished cord or cable.

I have also found that cords of the above constructions, when twisted to provide a minimum twist not less than 19.0—9.0, a gauge not exceeding .032 inch and a stretch capacity not exceeding 11% elongation when tested in a bone dry condition on a Scott single strand tester with spool type jaws at 10 pound load, are particularly adapted for fabrication into cord fabrics suitable for use in the construction of vehicle tires, and more especially I have found that when a cord fabric is produced in which the ratio of the warp cords thereof to the open spaces between such cords when measured linearly across the several cords at right angles thereto is not less than two to one, such fabric is particularly adapted for use as a flipper strip and as a chafing strip in the body portion of the tire and when so employed eliminates the causes of inner tube and bead failure hereinbefore mentioned.

It will be understood that the percentage of elongation of the cords is determined in accordance with established standards of the American Society for Testing Materials, which provide that when a Scott single strand tester with ¾" spool type jaws is employed the length of the specimen between the jaw nips is 13 inches while the length between centers of the spools is 10 inches. In lieu of the Scott single strand tester, the A. S. T. M. standard cam-clamp type tester may be employed, in which case the length of the specimen cord under test would be 10 inches between the nips of the cam clamps, the percentage of elongation obtained in such test for a given cord being somewhat lower than that obtained when tested on the Scott tester.

In other words, I have discovered as my present invention that low stretch, low gauge and high twist cords of the foregoing specifications, when fabricated so that the space between adjacent warp cords does not exceed in width one-half the width or gauge of each cord, provide a fabric which is at once sufficiently flexible and strong that when employed as flipper and chafing strips they permit flexing of the side walls of the tire about the flange of the supporting wheel rim as a fulcrum, while permitting the inner bead portion of the tire to remain stationary with respect to said supporting wheel rim, thereby eliminating the destructive chafing action of the bead toe against the inner tube. The number of warp cords or ends which are laid per inch of the fabric varies, of course, depending upon the gauge of the particular cord employed. Thus, in order to obtain the desired two to one ratio of warp cord to space intervening the cords, approximately 23 cords of .029 gauge would be laid in parallel relation per inch of fabric measured at right angles to the length of the cord. If, for example, a cord of .032 inch gauge were to be employed approximately twenty-one of such cords would be employed per inch of fabric. It will be understood, of course, that while the ratio of cord to space may exceed two to one, it is not practicable to reduce this ratio.

Reference has been made to the fact that the cords may be fabricated into a weftless fabric by subjecting them to a calendering process in which the several cords are covered with a coating of rubber composition to hold them together, or they may be woven into a cord fabric in which the warp cords are held together by single yarn fillings or picks spaced at suitable intervals to hold the warp cords together. As has been indicated, these picks serve no function other than to maintain the cords in parallel, single plane relation and when such picks are employed, they preferably do not exceed in number six per inch measured linearly along the warp cords.

Also, as has already been indicated, when a cord fabric of the character just described is employed to form the plies of the tire carcass, it is so arranged that the cords composing each ply extend at a bias or angularly across the carcass body. Similarly, when such fabric is employed as the reinforcing element in the bead portion of the tire, particularly as the flipper strip and the chafing strip, it is cut and applied about the bead so that the cords thereof also extend at a bias or angularly to the circumferential bead line. For best results, it is preferred that the fabrics forming the flipper and chafing strips be each so arranged that any given cord thereof, at the point where it crosses the circumferential bead line, forms an angle of not less than 30 degrees with a plane tangential to the bead at said point, it being within the contemplation of this invention to position said fabric or fabrics so that the said angularity or bias of the cords thereof with respect to the circumferential bead line may be increased to as much as 90 degrees, in which event the cords would extend radially with respect to said circumferential bead line.

As appears most clearly in Figure 1, the flipper strip 13 is looped about the bead 12 to unequal extents so that the parts 13a and 13b thereof, when secured together in face to face engagement, form in effect a two-ply reinforcing element which extends radially outwards from the bead to a point in the side wall of the tire beyond the flange of the wheel rim. By forming the parts 13a and 13b of unequal radial lengths, a feathered edge is provided which does not require gum-stripping in order to avoid sharp or abrupt edges such as might cut into and through the immediately adjacent carcass plies. Also, by virtue of the fact that the flipper strip is devoid of weft cords such as are present in the square woven fabrics heretofore commonly employed to form the flipper strips, the destructive sawing action upon the cords of the adjoining carcass plies as well as upon the warp cords of the flipper strip itself, as occasioned by such weft cords, is entirely eliminated. Further, due to the fact that the cords of the flipper strip fabric as constructed in accordance herewith all run in the same direction, the rubber with which the fabric is coated prior to its incorporation in the tire carcass is forced lengthwise between the spaced cords of the fabric and is exuded from between the ends thereof to form an effective rubber seal between the free edges of the fabric and the carcass plies which overlie it.

It will be understood that in accordance with the present invention flipper strips and chafing strips are to be fabricated of the low stretch, low gauge and high twist cords falling within the specifications of such cords as disclosed in my prior Reissue Patent No. 20,316, and accordingly the characteristics of such cords as set forth in the prior patent, particularly as they are pertinent to the present invention, are incorporated herein by reference thereto. Inasmuch as the present invention is susceptible of various changes and modifications without involving a departure from the principles thereof, it is intended to claim the invention broadly, as well as specifically, as indicated by the appended claims.

What is claimed as new and useful is:

1. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being fabricated of cords having a twist of not less than 19—9, a gauge not exceeding 0.032 inch and a maximum elongation of 11 percent subsequent to the application of a two pound load thereto when tested bone dry, said cords being arranged in a single plane, spaced parallel relation with the number thereof per inch being such that the ratio of cord to open space between cords measured linearly across the several cords at right angles thereto is not less than two to one.

2. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being fabricated of spaced, parallel cords arranged in a single plane and numbering not less than 23 per inch measured linearly across the cords at right angles thereto, each of said cords having a twist of not less than 19—9, a percentage of elongation which does not increase more than eleven percent as the load applied thereto is increased from two pounds to the breaking load, and a gauge such that the ratio of cord to open space between cords is not less than two to one per inch of fabric measured linearly at right angles to the cords.

3. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being formed of a cord fabric composed of a plurality of spaced, parallel highly twisted cords in each of which the stretch capacity and gauge have been materially reduced without substantial impairment of the flexing properties thereof, the gauge of each cord being of 0.032 inch maximum and the number thereof per linear inch normal to the cords being such that the ratio of cords to open space between cords is not less than two to one.

4. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being formed of a cord fabric embodying spaced, parallel cords each having a higher degree of twist than the twist required to produce ordinary tire carcass cord and in which the extensibility has been so materially reduced that its capacity for elongation is less than that possessed by ordinary tire carcass cord, the cords being further characterized in that they are of a gauge less than that of ordinary carcass cord having a lower twist and higher elongation than above specified, said cords being so arranged that the space between any pair of adjacent cords does not exceed in width one half the cord gauge.

5. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being formed of a cord fabric embodying spaced, parallel cords each having a higher degree of twist than the twist required to produce ordinary tire carcass cord and in which the extensibility has been so materially reduced that its capacity for elongation is less than that possessed by ordinary tire carcass cord, the cords being further characterized in that they are of a gauge less than that of ordinary carcass cord having a lower twist and higher elongation than above specified, said cords being so arranged that the space between any pair of adjacent cords does not exceed in width one half the cord gauge, said cords being held together by a coating or layer of rubber composition.

6. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being formed of a cord fabric embodying spaced, parallel cords each having a higher degree of twist than the twist required to produce ordinary tire carcass cord and in which the extensibility has been so materially reduced that its capacity for elongation is less than that possessed by ordinary tire carcass cord, the cords being further characterized in that they are of a gauge less than that of ordinary carcass cord having a lower twist and higher elongation than above specified, said cords being so arranged that the space between any pair of adjacent cords does not exceed in width one half the cord gauge, said cords being held together by a plurality of single yarn picks not exceeding six per linear inch of the cords.

7. In a pneumatic tire the carcass body of which is composed of laminated cord fabric plies terminating at opposite sides thereof in circumferentially extending beads, a separate cord fabric strip incorporated in the said bead region of the tire and extending upwardly therefrom to a point in the side wall of the tire located above the rim flange line thereof, said strip being formed of a cord fabric embodying spaced parallel cords each having a higher degree of twist than the twist required to produce ordinary tire carcass cord and in which the extensibility has been so materially reduced that its capacity for elongation is less than that possessed by ordinary tire carcass cord, the cords being further characterized in that they are of a gauge less than that of ordinary carcass cord having a lower twist and higher elongation than above specified, said cords being so arranged that the space between any pair of adjacent cords does not exceed in width one half the cord gauge, said strip being so cut and disposed relatively to the bead of the tire that the cords thereof, at the points where they respectively cross the circumference of said bead, each forms an angle of not less than 30 degrees with a plane tangential to the bead circumference at said point.

ARTHUR H. NELLEN.